(12) United States Patent
Gupta et al.

(10) Patent No.: US 8,596,954 B2
(45) Date of Patent: Dec. 3, 2013

(54) METHOD AND SYSTEM FOR REDUCING SEAL GAS CONSUMPTION AND SETTLE-OUT PRESSURE REDUCTION IN HIGH-PRESSURE COMPRESSION SYSTEMS

(75) Inventors: Manoj K. Gupta, Houston, TX (US); Jose L. Gilarranz, Katy, TX (US); Steven Nove, Houston, TX (US); Kenneth Devito, Rockport, TX (US)

(73) Assignee: Dresser-Rand Company, Olean, NY (US)

( * ) Notice: Subject to any disclaimer, the term of this patent is extended or adjusted under 35 U.S.C. 154(b) by 0 days.

(21) Appl. No.: 13/521,793

(22) PCT Filed: Jun. 28, 2011

(86) PCT No.: PCT/US2011/042198
§ 371 (c)(1),
(2), (4) Date: Sep. 20, 2012

(87) PCT Pub. No.: WO2012/018459
PCT Pub. Date: Feb. 9, 2012

(65) Prior Publication Data
US 2013/0129471 A1   May 23, 2013

Related U.S. Application Data

(60) Provisional application No. 61/367,803, filed on Jul. 26, 2010.

(51) Int. Cl.
*F04D 25/00*   (2006.01)
*F04D 29/10*   (2006.01)

(52) U.S. Cl.
USPC .............................. 415/1; 415/112; 415/230

(58) Field of Classification Search
USPC ........ 415/199.1, 174.5, 144, 111, 112, 230, 1
See application file for complete search history.

(56) References Cited

U.S. PATENT DOCUMENTS

| | | | | |
|---|---|---|---|---|
| 3,999,882 | A * | 12/1976 | Purton | 415/112 |
| 6,607,348 | B2 * | 8/2003 | Jean | 415/1 |
| 6,802,689 | B2 * | 10/2004 | Nogiwa | 415/26 |
| 2009/0290971 | A1 * | 11/2009 | Shamseldin et al. | 415/1 |
| 2010/0254811 | A1 * | 10/2010 | Kuzdzal et al. | 415/230 |

FOREIGN PATENT DOCUMENTS

| | | |
|---|---|---|
| EP | 1008759 | 6/2000 |
| JP | 62258177 | 11/1987 |
| JP | 62258195 | 11/1987 |
| JP | 63246498 | 10/1988 |
| JP | 2003097487 | 4/2003 |
| WO | 2012018459 | 2/2012 |

OTHER PUBLICATIONS

International Application No. PCT/US2011/042198—Notification of International Search Report and Written Opinion mailed Feb. 21, 2012.

* cited by examiner

*Primary Examiner* — Edward Look
*Assistant Examiner* — William Grigos
(74) *Attorney, Agent, or Firm* — Edmonds & Nolte, PC

(57) ABSTRACT

A compressor is disclosed having a shaft seal assembly and system that allows a high-pressure compressor to settle-out at a lower pressure level during shutdown. The seal assembly may be disposed about a portion of the shaft and define a blow-down seal chamber, the seal assembly including one or more gas seals in fluid communication with the blow-down seal chamber. A blow-down line is communicably coupled to the blow-down seal chamber to reference the blow-down seal chamber to a low pressure reference, such as a separate centrifugal compressor, or the like. Referencing the blow-down seal chamber to the low pressure reference reduces the required sealing pressure of the one or more gas seals. A valve may be disposed in the blow-down line and configured to regulate a flow of process gas leakage through the blow-down line.

20 Claims, 5 Drawing Sheets

METHOD AND SYSTEM FOR REDUCING SEAL GAS CONSUMPTION AND SETTLE-OUT PRESSURE REDUCTION IN HIGH-PRESSURE COMPRESSION SYSTEMS

CROSS-REFERENCE TO RELATED APPLICATIONS

This application is a U.S. national stage application of PCT Patent Application No. US2011/042198, filed Jun. 28, 2011, which claims priority to U.S. Provisional application No. 61/367,803, which was filed on Jul. 26, 2010. The contents of each priority application are incorporated herein by reference in their entirety to the extent consistent with the present disclosure.

BACKGROUND

During the shut-down process of a high-speed compressor, such as a centrifugal compressor, and after the compressor remains idle at zero speed, the pressure inside the compressor casing eventually reaches what is known as "settle-out" pressure. At settle-out pressure, the pressures inside the compressor and any process piping connected thereto reach an equilibrium that will typically remain until the system is either vented or restarted. Current seal technology implemented in high-pressure compressors is limited as to how high the settle-out pressure can reach before exceeding the current state of the art of internal seals, such as gas seals, and thereby risking potential seal failure.

One common method of circumventing this occurrence is to overdesign the machine and accompanying process system such that the projected settle-out pressure is always within the design range of the seal system. Oftentimes, this can involve designing and installing an expensive and inexperienced prototype seal. Unfortunately, prototype seals often have unknown reliability and are designed only for the application at hand. Another common method of reducing the effects of settle-out pressure is to design the process system to favor the suction (i.e., low pressure) volume of the compressor system, and minimizing the volume of the high pressure system isolated by the shut down valve. This frequently results, however, in larger and more costly process systems.

What is needed, therefore, is a system and method configured to allow a high-pressure compressor to settle-out at reduced pressure levels while simultaneously reducing blow-down seal leakage during normal operation.

SUMMARY

Embodiments of the disclosure may provide a compressor. The compressor may include an inlet for receiving a process gas, and an outlet for discharging a high-pressure process gas, and a shaft extending from a first end of the compressor to a second end of the compressor, the shaft having one or more compression stages disposed about the shaft and rotatable therewith, wherein the one or more compression stages are configured to receive and compress the process gas from the inlet and discharge the high-pressure process gas via the outlet. The compressor may further include a seal assembly disposed about a portion of the shaft and defining a blow-down seal chamber, the seal assembly including at least one gas seal in fluid communication with the blow-down seal chamber, and a blow-down line communicably coupled to the blow-down seal chamber to reference the blow-down seal chamber to a low pressure reference and thereby reduce a pressure which the at least one gas seal must seal against. In one embodiment, a valve is disposed in the blow-down line and configured to regulate a flow of process gas leakage through the blow-down line.

Embodiments of the disclosure may further provide a method of operating a compressor. The method may include progressively compressing a process gas in one or more compression stages disposed about a rotatable shaft, sealing the process gas within the compressor with a seal assembly disposed about the shaft and defining a blow-down seal chamber, the seal assembly including at least one gas seal in fluid communication with the blow-down seal chamber, and referencing the blow-down seal chamber to a lower-pressure machine via a blow-down line. The method may further include regulating a flow of process gas leakage through the blow-down line with a valve disposed in the blow-down line.

Embodiments of the disclosure may further provide a shaft seal system. The shaft seal system may include a seal assembly disposed about a rotatable shaft and defining a blow-down seal chamber, the seal assembly including at least one gas seal in fluid communication with the blow-down seal chamber, and a blow-down line communicably coupled to the blow-down seal chamber to reference the blow-down seal chamber to a low-pressure compressor to reduce a pressure which the at least one gas seal must seal against. The shaft seal system may further include a valve disposed in the blow-down line and configured to regulate a flow of process gas leakage through the blow-down line, and control logic communicably coupled to the valve and configured to adjust the valve in response to pressures detected in the blow-down line.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
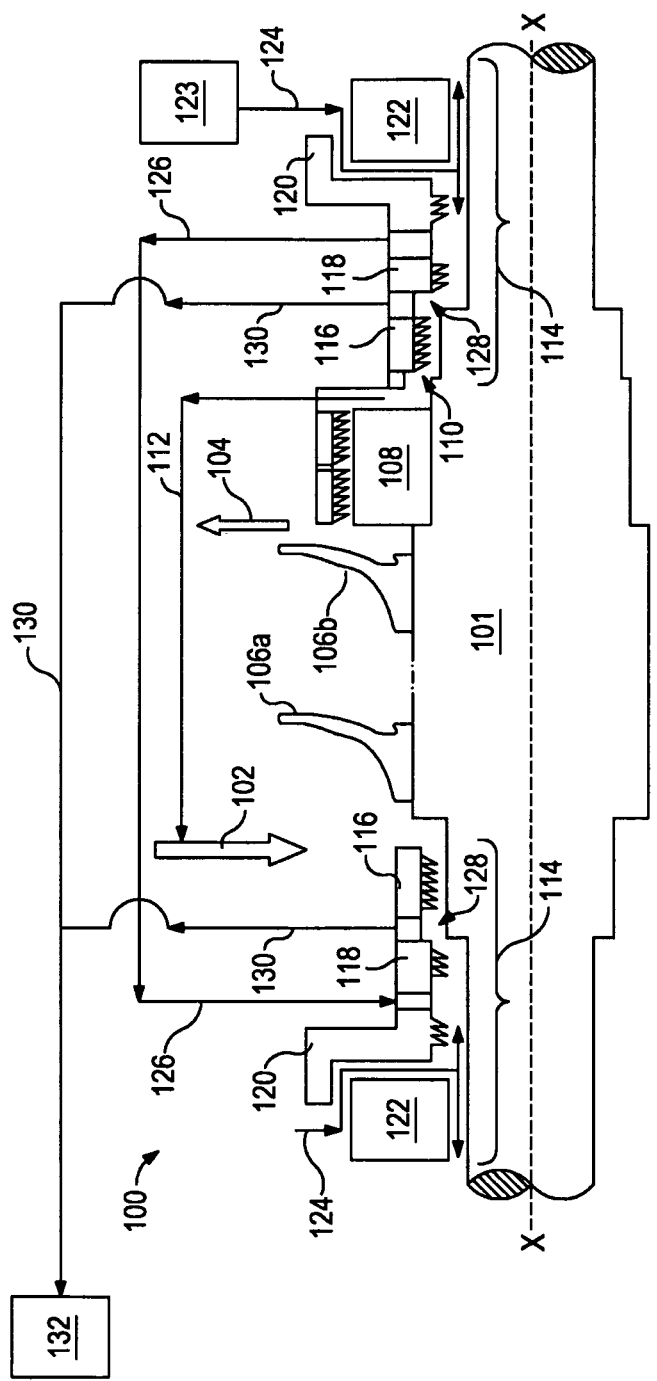
FIG. 1 illustrates an exemplary compressor and seal assembly, according to one or more embodiments disclosed.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 illustrates an exemplary compressor 100, according to one or more embodiments disclosed. The compressor 100 may be a turbomachine, such as a high-pressure centrifugal compressor, having a shaft 101 extending longitudinally from one end of the compressor 100 to the other. The shaft 101 may be configured to rotate about a longitudinal axis X. For simplicity, the portions of the compressor 100 located below the longitudinal axis X of the shaft 101 are omitted, whereas the portions above the shaft 101 axis X are depicted in some detail.

The compressor 100 may have an inlet 102 configured to receive a process gas and deliver the process gas to the compressor 100 for processing. In one or more embodiments, the process gas may include a hydrocarbon gas, such as natural gas or methane derived from a production field or via a pressurized pipeline. In other embodiments, the process gas may include $CO_2$, $H_2S$, $N_2$, methane, ethane, propane, $i$-$C_4$, $n$-$C_4$, $i$-$C_5$, $n$-$C_5$, and/or combinations thereof. The pressure of the incoming process gas will oftentimes depend on the type of process gas being compressed, and/or the state of the production field where a hydrocarbon process gas is being compressed.

The compressor 100 may further include an outlet 104 configured to discharge a high-pressure compressed gas. In one or more embodiments, the compressor 100 may be capable of compressing the process gas to pressures reaching about 8000 psi to about 9000 psi, or even higher. As can be appreciated, however, embodiments contemplated herein include compressors 100 that are capable of compressing process gases to higher or lower pressures for varying applications, without departing from the scope of the disclosure.

As illustrated, the compressor 100 may be a straight through-type compressor, including successive, axially-spaced gas compression stages or impellers 106 (e.g., stages 106a and 106b). Each compression stage 106 may be coupled to or otherwise attached circumferentially about the shaft 101 and configured for rotation therewith. FIG. 1 shows, by way of example, a first and a second compression stage 106a and 106b, but it is understood that any number of such stages or impellers may be used without departing from the scope of the disclosure. For instance, embodiments contemplated herein include compressors having between one and ten gas compression stages. In operation, the compression stages 106a,b progressively compress the incoming process gas and discharge the high-pressure gas from the compressor 100 via the outlet 104.

The compressor 100 may further include a balance piston labyrinth seal 108 disposed axially-adjacent the second or last impeller 106b and adapted to separate the high-pressure process gas from an adjacent balance chamber 110. In one or more embodiments, the balance chamber 110 may be maintained at or near the inlet 102 pressure by referencing the balance chamber 110 to the compressor inlet 102 via a pressure equalization line 112. Consequently, the outboard side of the balance piston labyrinth seal 108 may be subjected to a lower pressure emanating from the inlet 102 and thereby creating a pressure differential opposite the direction of the impellers 106a,b and opposite the net axial forces resulting from the impellers 106a,b.

In order to enclose or otherwise contain the circulating process gas within the compressor 100, and prevent process gas leakage into the surrounding environment, the compressor 100 may include a series or an assembly of seals 114 disposed circumferentially about the shaft 101 on either side of the impellers 106a,b. Each seal assembly 114 may include, in at least one configuration, a blow-down labyrinth seal 116, a seal balance labyrinth seal 118, an inner labyrinth seal 120, and a gas seal 122, each seal 116, 118, 120, 122 being axially-spaced along the length of the shaft 101. It will be appreciated by those skilled in that art that the number and type of seals may vary depending on the application or pressure demands. During operation, any process gas leakage escaping via the minute gaps defined between each adjacent seal 116, 118, 120 is progressively minimized as it advances toward the gas seal 122. So that each seal balance labyrinth seal 118 experiences, or "sees," the same or substantially the same pressure, a seal balance line 126 may be included to reference these seals 118 to each other.

The gas seal 122 may be a dry gas seal as known in the art, and may be a single or tandem gas seal with an accompanying gas seal panel 123. Each gas seal 122 may be configured to receive a seal gas 124 adapted to maintain a high-pressure sealing effect and prevent the further progression of any process gas leakage. In at least one embodiment, the seal gas 124 may include a cleaned or otherwise filtered portion of the high-pressure process gas. In other embodiments, however, the seal gas 124 may include a pressurized inert gas, such as nitrogen or argon, derived from an external source, such as a small reciprocating compressor. In yet other embodiments, the seal gas 124 may be air. In operation and in order to block further process gas leakage, the seal gas 124 may be injected at each gas seal 122 at a pressure higher than the pressure of the preceding inner-areas of the compressor 100. For example, the seal gas 124 may be injected at a pressure higher than the pressure seen by each inner labyrinth seal 120, thereby forcing any process gas leakage back across the inner labyrinth seal 120, as indicated by the arrows.

A blow-down seal chamber 128 may interpose the blow-down seal 116 and the seal balance labyrinth seal 118. The blow-down seal chamber 128 may be communicably coupled or otherwise referenced to a low pressure reference 132 via a blow-down line 130. In one or more embodiments, the low pressure reference 132 may be any machine, device, or pressurized cavity having a pressure that is generally lower than the pressures generated by the high-pressure compressor 100. For instance, the low pressure reference 132 may be a separate compression unit, such as a low-pressure centrifugal or reciprocating compressor. As used herein, the term "low-pressure compressor" indicates a compression unit that is configured to compress a process gas to pressures less than what the compressor 100 is capable of. In other embodiments, the low pressure reference 132 may include a pressurized chamber. In yet other embodiments, the low pressure reference 132 may be an intermediate compression stage of the compressor 100.

In one embodiment, the blow-down seal chamber 128 is referenced to the low pressure reference 132 in order to reduce the overall pressure seen by the gas seal 122. As will be appreciated, this may prove advantageous in applications where the gas seal 122 is unproven or otherwise unable to withstand the sealing pressures during normal operation and/or settle-out during shut down procedures of the compressor 100. Accordingly, the implementation of the blow-down line 130 may circumvent the need to overdesign the gas seals 122 and accompanying gas seal panel 123, to a higher pressure rating which may be costly and ultimately ineffective.

In one or more embodiments, where the low pressure reference 132 is a separate compression unit, the blow-down line 130 may reference the blow-down seal chamber 128 to, for example, the inlet or suction side of the low pressure reference 132. In other embodiments, the blow-down line 130 may reference the blow-down seal chamber 128 to the discharge side of the low pressure reference 132, such as upstream of a discharge shut down valve on the separate compression unit. Where the separate compression unit has several compression stages, the blow-down seal chamber 128 may be referenced to an intermediate compression stage 106 of the low pressure reference 132. In yet other embodiments, the blow-down seal chamber 128 may be referenced to an intermediate compression stage 106 of the compressor 100 itself, especially in embodiments where there are more than two compression stages 106a,b and a variety of pressure ranges able to be referenced to.

Figure 2:
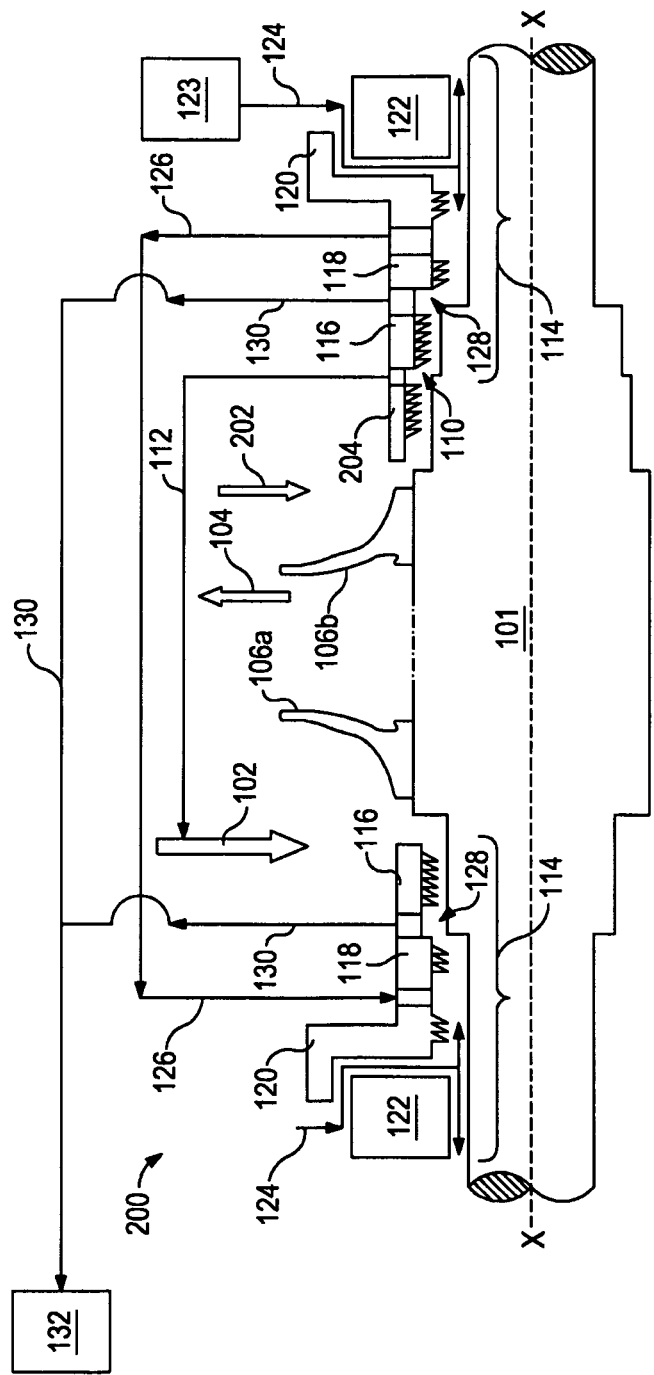
FIG. 2 illustrates another exemplary compressor and seal assembly, according to one or more embodiments disclosed.

Referring now to FIG. 2, depicted is another exemplary compressor 200, according to one or more embodiments described. The compressor 200 may include several components that are similar to the compressor 100 of FIG. 1. Consequently FIG. 2 may be best understood with reference to FIG. 1, where like numerals represent like components that will not be described again in detail. Unlike the compressor 100 of FIG. 1, however, the compressor 200 of FIG. 2 may include a back-to-back compressor arrangement as known in the art, where the impellers or compression stages 106 (e.g., 106a and 106b) are situated on the shaft 101 so that the incoming process gas is progressively compressed toward the middle of the shaft 101 on either side. Although only two compression stages 106a,b are depicted, it will be again appreciated that any number of compression stages 106 may be used in the compressor without departing from the scope of the disclosure.

In operation, a process gas may be introduced into the compressor 200 via the inlet 102 to be compressed by the first impeller or compression stage 106a and generate a compressed process gas. The compressed process gas is then discharged from the first compression stage 106a (or any number of succeeding compression stages where there are more than two compression sages 106) and subsequently injected into the second impeller or compression stage 106b via a second compressor inlet 202. The second compression stage 106b may be configured to further increase the pressure of the compressed process gas and eventually discharge a high-pressure process gas via the compressor outlet 104.

Because of the back-to-back configuration, the compressor 200 does not necessarily require a balance piston labyrinth seal 108, as described with reference to FIG. 1. Instead, the compressor 200 may include, for example, a gas balance labyrinth seal 204 disposed axially-adjacent and outboard from the last impeller 106b and adapted to separate the high-pressure process gas within the compressor 200 from the balance chamber 110. The gas balance line 112, seal balance line 126, and blow-down line 130 may function substantially similar to the embodiments disclosed with reference to FIG. 1 and, therefore, will not be discussed again in detail.

Figure 3:
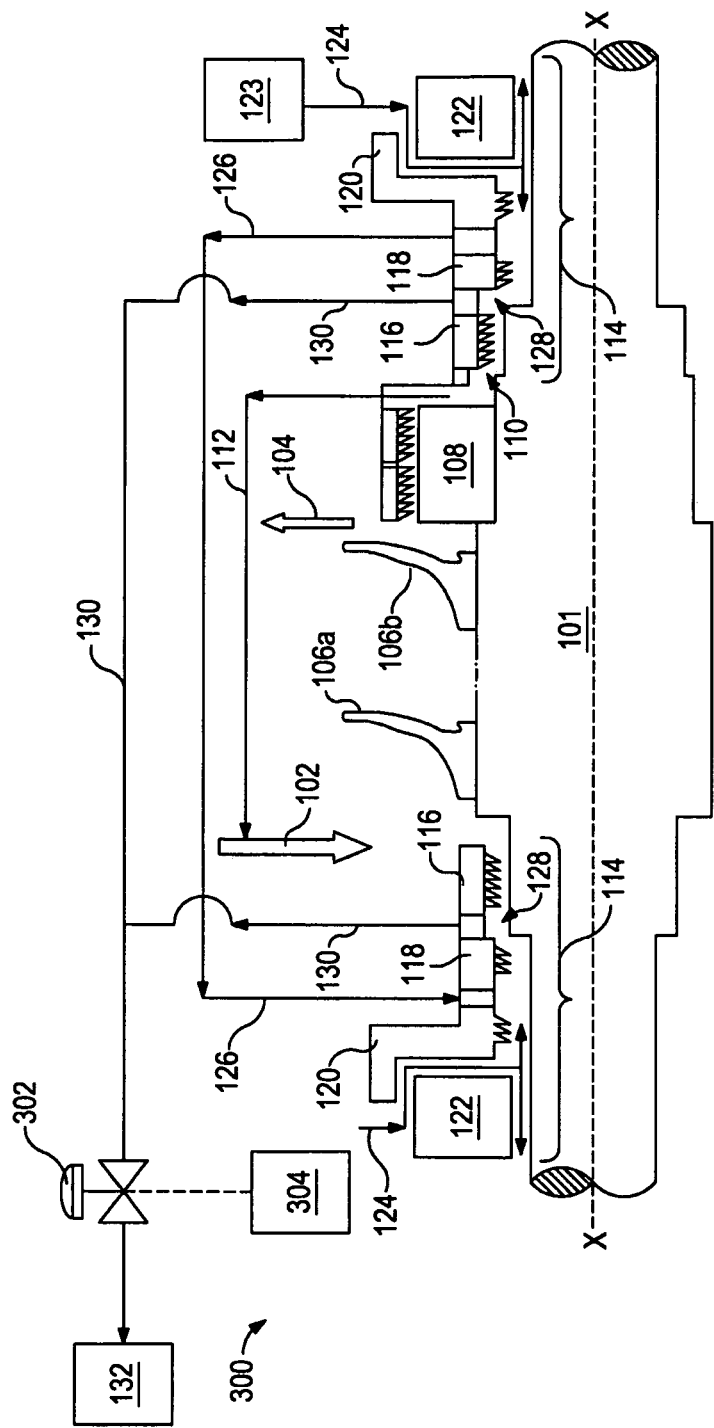
FIG. 3 illustrates another exemplary compressor and seal assembly, according to one or more embodiments disclosed.

Referring now to FIG. 3, depicted is another embodiment of the compressor 100 of FIG. 1, shown and embodied as compressor 300 in FIG. 3. As such, FIG. 3 may be best understood with reference to FIG. 1 where like numerals represent like components that will not be described again in detail. At least one notable difference between the compressor 100 of FIG. 1 and the compressor 300 of FIG. 3 is the implementation of a valve 302 in the blow-down line 130. Without the valve 302 during normal operation, the compressor 300 (including compressors 100 and 200) may be constantly recycling process gas leakage via the blow-down line 130 to the low pressure reference 132 where the process gas may ultimately be recompressed back up to the high-pressures previously experienced. Consequently, horsepower is lost, and an overall increase in power consumption is required to offset this loss.

The valve 302, however, may be used to selectively provide low pressure reference when necessary in lieu of continuous leakage recycle thereby minimizing process gas leakage to the low pressure reference 132 referenced downstream by the blow-down line 130. Furthermore, the valve 302 may be implemented in applications where it is necessary to change the seal reference pressure of the compressor 300 beyond a predetermined range of pressures where the gas seals 122 and accompanying gas seal panel 123, are designed to safely operate. Consequently, instead of redesigning or reconfiguring the gas seals 122 and gas seal panel 123 for pressure anomalies, the pressures seen by the gas seals 122 and gas seal panel 123 may be adjusted in real-time via the valve 302, thereby effectively expanding the operating range of the compressor 300.

During normal operation the valve 302 may be closed and adjusted only when needed. During shutdown events, when settle-out pressures may potentially exceed the design pressure of the gas seals 122, the valve 302 may be opened to relieve or reference the pressure of the blow-down seal chamber 128 to the low pressure reference 132. Referencing the blow-down seal chamber 128 to the low pressure reference 132 reduces the sealing pressure of the gas seals 122 to a pressure that can be safely and reliably handled.

Although the valve 302 may be adjusted manually when desired, in one or more embodiments, the valve 302 may also be controlled or otherwise regulated via control logic 304 communicably coupled to the valve 302. Accordingly, the valve 302 may include one or more servos or other mechanical devices (not shown) configured to selectively open and close the valve 302 in response to a command received from the control logic 304. Moreover, the valve 302, or the blow-down line 130 adjacent the valve 302, may include one or more pressure transducers, transmitters, senders, indicators and/or piezometers or manometers (not shown) configured to sense the pressure in the blow-down line 130 and transmit said pressure readings to the control logic 304 for processing. The control logic 304 may be programmed with a predetermined pressure range within which the compressor 300 and its accompanying gas seals 122 may safely operate. Such predetermined pressure ranges may be exceeded or otherwise breached during compressor 300 settle-out or an increase in discharge pressure via the outlet 104, as generally described above. If the pressure in the blow-down line 130 exceeds the predetermined pressure range, the control logic 304 may react by either commanding the servos to adjust the valve 302, or alert the operator to the pressure range anomaly and thereby induce manual adjustment of the valve 302.

Accordingly, the valve 302 may be used in the blow-down line 130 to mitigate a potential failure of the gas seals 122 by maintaining a reference pressure of the gas seals 122 within safe design limitations. Moreover, the valve 302 may allow the gas seals 122 and gas seal panel 123 to be sized more cost effectively, since the gas seals 122 may not have to withstand the extreme pressure rating limitations for extreme pressure anomalies. As can be appreciated, this can result in a significant cost savings.

In at least one embodiment, the valve 302 may be partially or fully open during normal operation of the compressor 300. For example, the valve 302 may be opened during normal operation when a higher compressor 300 discharge pressure is required, but the gas seals 122 are not prepared to receive such an increase. Accordingly, the valve 302 may be opened and adjusted so that the gas seals 122 experience pressures within its design limitations so that the compressor 300 may operate at higher operating pressures without having to completely redesign the gas seals 122 and gas seal support systems (e.g., the gas seal panel 123)

The valve 302 may also prove advantageous in embodiments where the process gas is derived from a hydrocarbon field where field conditions gradually change over time. For example, field pressures may progressively decline over time such that the design of the compressor 300 may become out of date for what pressure ranges it was originally designed for. As the field conditions change, the valve 302 may be adjusted correspondingly to compensate for the increased or decreased pressure demand that may be required of the gas seals 122.

Figure 4:
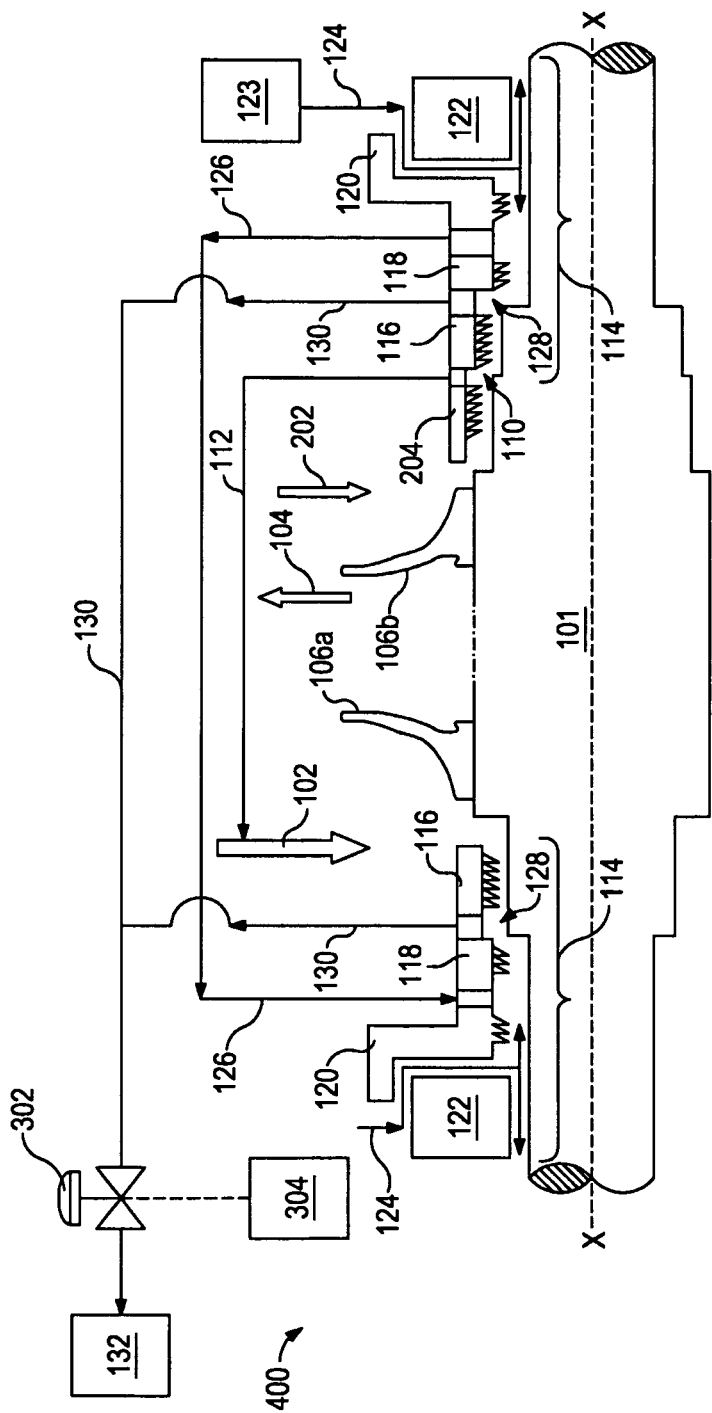
FIG. 4 illustrates another exemplary compressor and seal assembly, according to one or more embodiments disclosed.

Referring now to FIG. 4, depicted is another embodiment of the back-to-back compressor 200 of FIG. 2, shown and embodied as compressor 400 in FIG. 4. As such, FIG. 4 may be best understood with reference to FIG. 2, where like numerals represent like components that will not be described again in detail. The compressor 400 may include the valve 302, as generally described above with reference to FIG. 3. The valve 302 disposed in the blow-down line 130 may allow multiple types of high-pressure compressors (e.g., straight through, back-to-back, etc.) to operate efficiently over a broader range of operating pressures, and also protect the gas seals 122 from damage or failure during settle-out.

Figure 5:
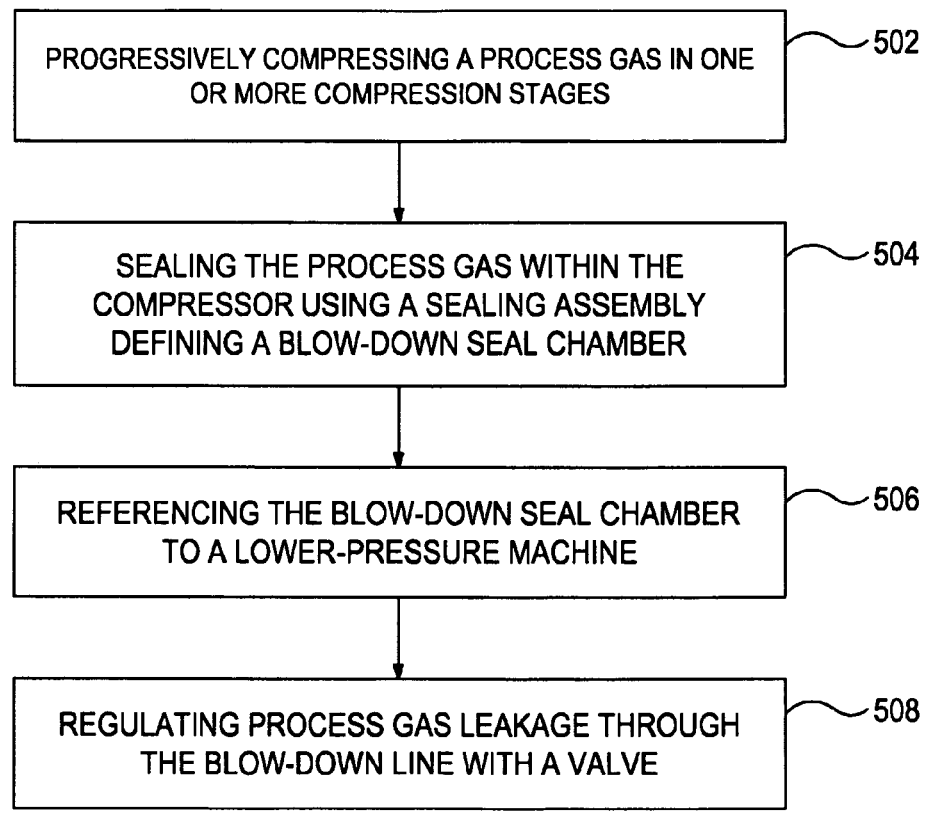
FIG. 5 is a flowchart of a method of operating a compressor, according to one or more embodiments disclosed.

Referring now to FIG. 5, illustrated is a flowchart of a method 500 of operating a compressor. The method 500 may include progressively compressing a process gas in one or more compression stages disposed about a rotatable shaft, as at 502. The process gas may be sealed within the compressor using a seal assembly that is disposed about the shaft and defines a blow-down seal chamber, as at 504. A blow-down labyrinth seal may form part of the seal assembly and be disposed adjacent the blow-down seal chamber. The blow-down seal chamber may be referenced to a low pressure reference, such as a separate centrifugal compressor or pressurized cavity, via a blow-down line, as at 506. Consequently, the blow-down labyrinth seal may also be referenced to the low pressure reference via the blow-down line. Process gas leakage through the blow-down line may then be regulated using a valve disposed in the blow-down line, as at 508.

During normal operation, the valve may be in a closed position and would only open during the shutdown of the compressor to allow the high-pressure compressor to settle-out at a lower pressure level.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. A compressor, comprising:
    an inlet for receiving a process gas, and an outlet for discharging a high-pressure process gas;
    a shaft extending from a first end of the compressor to a second end of the compressor, the shaft having one or more compression stages disposed about the shaft and rotatable therewith, wherein the one or more compression stages are configured to receive and compress the process gas;
    a seal assembly disposed about a portion of the shaft and defining a blow-down seal chamber, the seal assembly including at least one gas seal in fluid communication with the blow-down seal chamber;
    a blow-down line communicably coupled to the blow-down seal chamber to reference the blow-down seal chamber to a separate compression unit and thereby reduce a pressure which the at least one gas seal must seal against; and
    a valve disposed in the blow-down line and configured to regulate a flow of process gas leakage through the blow-down line.

2. The compressor of claim 1, wherein the compressor is a straight through centrifugal compressor.

3. The compressor of claim 1, wherein the compressor is a back-to-back centrifugal compressor.

4. The compressor of claim 1, wherein the blow-down seal chamber is referenced to a suction side of the separate compression unit.

5. The compressor of claim 1, wherein the blow-down seal chamber is referenced to a discharge side of the separate compression unit.

6. The compressor of claim 1, wherein the separate compression unit is a centrifugal compressor.

7. The compressor of claim 6, wherein the blow-down seal chamber is referenced to an intermediate compression stage of the centrifugal compressor.

8. The compressor of claim 1, wherein the blow-down seal chamber is referenced to an intermediate compression stage of the separate compression unit.

9. The compressor of claim 1, wherein the valve further comprises a mechanical device configured to adjust the valve, and a control logic is communicably coupled to the mechanical device and configured to direct the mechanical device to selectively adjust the valve in response to pressures detected in the blow-down line.

10. A method of operating a compressor, comprising:
    progressively compressing a process gas in one or more compression stages disposed about a rotatable shaft;
    sealing the process gas within the compressor with a seal assembly disposed about the rotatable shaft and defining a blow-down seal chamber, the seal assembly including at least one gas seal in fluid communication with the blow-down seal chamber;

referencing the blow-down seal chamber to a separate compression unit via a blow-down line; and regulating a flow of process gas leakage through the blow-down line with a valve disposed in the blow-down line.

11. The method of claim 10, wherein regulating the flow of process gas leakage through the blow-down line further comprises:

maintaining the valve in a closed position during normal operation of the compressor; and opening the valve during compressor shut down to allow the compressor to settle-out at a pressure that can be safely handled by the at least one gas seal.

12. The method of claim 11, further comprising sending a command from a control logic to a mechanical device of the valve to selectively adjust the valve, the control logic being communicably coupled to the mechanical device.

13. The method of claim 10, further comprising opening the valve during normal operation of the compressor to compensate for a higher sealing pressure demand in the compressor.

14. The method of claim 10, further comprising referencing the blow-down seal chamber to a suction side of the separate compression unit.

15. The method of claim 10, further comprising referencing the blow-down seal chamber to a discharge side of the separate compression unit.

16. The method of claim 10, further comprising referencing the blow-down seal chamber to an intermediate compression stage of the separate compression unit.

17. A shaft seal system, comprising:

a seal assembly disposed about a rotatable shaft and defining a blow-down seal chamber, the seal assembly including at least one gas seal in fluid communication with the blow-down seal chamber;

a blow-down line communicably coupled to the blow-down seal chamber to reference the blow-down seal chamber to a low-pressure compressor in order to reduce a pressure which the at least one gas seal must seal against;

a valve disposed in the blow-down line and configured to regulate a flow of process gas leakage through the blow-down line, the valve including a mechanical device configured to adjust the valve; and a control logic communicably and operatively coupled to the mechanical device of the valve and configured to direct the mechanical device to selectively adjust the valve in response to pressures detected in the blow-down line.

18. The compressor of claim 17, wherein the blow-down seal chamber is referenced to a suction side of the low-pressure compressor.

19. The compressor of claim 17, wherein the blow-down seal chamber is referenced to a discharge side of the low-pressure compressor.

20. The compressor of claim 17, wherein the blow-down seal chamber is referenced to an intermediate compression stage of the low-pressure compressor.

* * * * *